United States Patent
Yang et al.

(10) Patent No.: US 9,292,072 B2
(45) Date of Patent: Mar. 22, 2016

(54) POWER MANAGEMENT METHOD FOR AN ELECTRONIC SYSTEM

(71) Applicant: VIA TECHNOLOGIES, INC., New Taipei (TW)

(72) Inventors: Xiaolu Yang, Beijing (CN); Zongpu Qi, Beijing (CN)

(73) Assignee: VIA TECHNOLOGIES, INC., New Taipei (TW)

(*) Notice: Subject to any disclaimer, the term of this patent is extended or adjusted under 35 U.S.C. 154(b) by 338 days.

(21) Appl. No.: 14/023,668

(22) Filed: Sep. 11, 2013

(65) Prior Publication Data

US 2014/0195840 A1 Jul. 10, 2014

(30) Foreign Application Priority Data

Jan. 6, 2013 (CN) .......................... 2013 1 0003482

(51) Int. Cl.
*G06F 1/32* (2006.01)

(52) U.S. Cl.
CPC ............ *G06F 1/3228* (2013.01); *G06F 1/3237* (2013.01); *G06F 1/3296* (2013.01)

(58) Field of Classification Search
CPC .... G06F 1/3206; G06F 1/3228; G06F 1/3296
USPC .................................................. 713/320, 323
See application file for complete search history.

(56) References Cited

U.S. PATENT DOCUMENTS

| | | | | |
|---|---|---|---|---|
| 7,634,669 | B2 * | 12/2009 | Ho ........................ | G06F 1/3206 713/300 |
| 7,821,864 | B2 * | 10/2010 | Totolos, Jr. et al. ...... | G11C 5/14 365/227 |
| 8,250,393 | B2 | 8/2012 | Qin et al. | |
| 2006/0242433 | A1* | 10/2006 | Fu ......................... | G06F 1/3203 713/300 |
| 2007/0245163 | A1* | 10/2007 | Lu ......................... | G06F 1/3203 713/300 |
| 2009/0204830 | A1* | 8/2009 | Frid ....................... | G06F 1/3203 713/322 |

(Continued)

FOREIGN PATENT DOCUMENTS

| | | |
|---|---|---|
| CN | 1766799 | 5/2006 |
| CN | 101441504 | 5/2009 |
| CN | 101526845 | 9/2009 |

OTHER PUBLICATIONS

English language translation of abstract of CN 1766799 (published May 3, 2006).

(Continued)

*Primary Examiner* — Chun Cao
(74) *Attorney, Agent, or Firm* — McClure, Qualey & Rodack LLP

(57) ABSTRACT

A power-management method is provided, and the power-management method includes setting a central processing unit in a first low-power state when receiving a second low-power state request requiring the central processing unit to enter the second low-power state, obtaining first idle periods of the peripheral modules respectively to determine a second idle period according to the first idle periods of the peripheral modules, determining whether the peripheral modules have not sent a data-access request during the second idle period, setting the central processing unit in the second low-power state when the peripheral modules have not sent the data-access request during the second idle period, wherein each first idle period is an interval period between two data transmissions of each peripheral module.

20 Claims, 4 Drawing Sheets

(56) References Cited

U.S. PATENT DOCUMENTS

| | | | |
|---|---|---|---|
| 2010/0077243 A1* | 3/2010 | Wang | G06F 1/3209 713/323 |
| 2010/0115311 A1 | 5/2010 | Tseng et al. | |
| 2010/0275045 A1* | 10/2010 | Qin | G06F 1/3215 713/322 |

OTHER PUBLICATIONS

English language translation of abstract of CN 101441504 (published May 27, 2009).

English language translation of abstract of CN 101526845 (published Sep. 9, 2009).

* cited by examiner

US 9,292,072 B2

POWER MANAGEMENT METHOD FOR AN ELECTRONIC SYSTEM

CROSS REFERENCE TO RELATED APPLICATIONS

This Application claims priority of China Patent Application No. 201310003482.1, filed on Jan. 6, 2013, the entirety of which is incorporated by reference herein.

BACKGROUND OF THE INVENTION

1. Field of the Invention

The invention relates to power-management methods for electronic systems, and more particularly to power-management methods for electronic systems having Advanced Configuration and Power Interface (ACPI).

2. Description of the Related Art

A method for lowering power consumption in unused computers, sub-systems and their peripheral devices and increasing battery efficiency, which is very important for computer systems, especially for portable computers, such as notebook computers, which often rely on power supply from batteries. Therefore, an electronic system normally employs power management, and there are lots of standards of power management, such as the Advanced Configuration and Power Interface (ACPI) specification. The ACPI is a power management open standard developed by Intel, Microsoft and Toshiba, and provides appropriate power and optimum working frequency in order to balance power saving and efficiency. It should be noted that ACPI is an interface shared between the software (operation system, OS) and hardware, and power management herein is OS-directed instead of BIOS-directed, which is more beneficial for manufacturers when integrating their standards with each other.

Typically, the OS determines whether to enter the power saving states in accordance with the configuration set by some application programs or users. The ACPI specification defines different power states which include a working state (G0), a sleeping state (G1), a software off state (G2), and hardware off state (G3). Normally, a system usually switches between a working state (G0) and a sleeping state (G1), wherein the system further has a power-saving level supported by devices and a power-saving level supported by central processor units. The processor power states (including C0, C1, C2, . . . , Cn state) of ACPI are all defined in the working state (G0). The processor normally executes instructions in the C0 state, and the OS may set the central processor unit to a low-power state (such as the C1, C2, . . . , CN state) when the system is idle for a period of time.

The low power states of the processor defined by ACPI include the C1, C2, C3 and C4 states, wherein the C2 state has lower power consumption than the C1 state, the C3 state has lower power consumption than the C2 state, and the C4 state has lower power consumption than the C3 state. In the C2 state, the processor power does not process any instruction, but monitors the access operation of the Bus Masters. The Bus Master is a unit for controlling buses in a computer system, such as the USB controller, PCI controller, etc. In the C3 state, the clocking of the central processor unit stops, and the central processor unit does not monitor the access operation of the Bus Masters. The voltage of the central processor unit in the C4 state is lower compared with the C3 state, so that the central processor unit has much lower power consumption in the C4 state.

When the operation system of the electronic system detects that the electronic system has no operation for a predetermined period, the operation system requires the central processor unit to enter the C3 or C4 state, so that the power consumption of the electronic system can be reduced.

In the C2 state, if an interrupt event occurs or the central processor unit is requested to process instructions, the central processor unit returns to the C0 state from the C2 state. In the C3 or C4 state, if an interrupt event occurs, the central processor unit is woken, and returns to the C0 state. If the bus master issues an accessing request, the central processor unit is woken, and returns to the C0 state from the C3 or C4 state.

BRIEF SUMMARY OF THE INVENTION

The invention provides a power-management method for an electronic system, wherein the electronic system comprises a central processing unit and a plurality of peripheral modules, and the power state of the central processing unit includes a working state, a first low-power state and a second low-power state. The power-management method comprises: setting the central processing unit in a first low-power state when receiving a request requiring the central processing unit to enter the second low-power state; obtaining first idle periods of peripheral modules respectively; determining a second idle period according to the first idle periods of the peripheral modules; determining whether the peripheral modules have not sent a data-access request during the second idle period; and setting the central processing unit in the second low-power state when the peripheral modules have not sent the data-access request during the second idle period, wherein each first idle period is an interval period between two data transmissions of each peripheral module.

The invention provides an electronic system, comprising: a central processing unit, wherein the power state of the central processing unit includes a working state, a first low-power state and a second low-power state; a plurality of peripheral modules; and a power-management module, setting the central processing unit in a first low-power state when receiving a request requiring the central processing unit to enter the second low-power state. The power-management module is configured to obtain first idle periods of the peripheral modules respectively, determine a second idle period according to the first idle periods of the peripheral modules, and determine whether the peripheral modules have not sent a data-access request during the second idle period; wherein when the peripheral modules have not sent the data-access request during the second idle period, the power-management module sets the central processing unit in the second low-power state; and wherein each first idle period is an interval period between two data transmissions of each peripheral module.

BRIEF DESCRIPTION OF DRAWINGS

The invention will become more fully understood by referring to the following detailed description with reference to the accompanying drawings, wherein.

DETAILED DESCRIPTION OF THE INVENTION

The making and using of the embodiments of the present invention are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

The invention provides a power-management method for an electronic system having the Advanced Configuration and Power Interface (ACPI). The invention dynamically changes the counting period of an idle counter according to the current operation state of the electronic system. In some embodiments, the invention further predicts the idle period, and determines whether to enter a lower power state accordingly, so that the power consumption and efficiency of the system can be balanced. On the other hand, the invention adjusts the timing of data transmission of the peripheral modules according to the current operation state of the electronic system, so that the period of the low-power state of the central processing unit can be extended.

Figure 1:
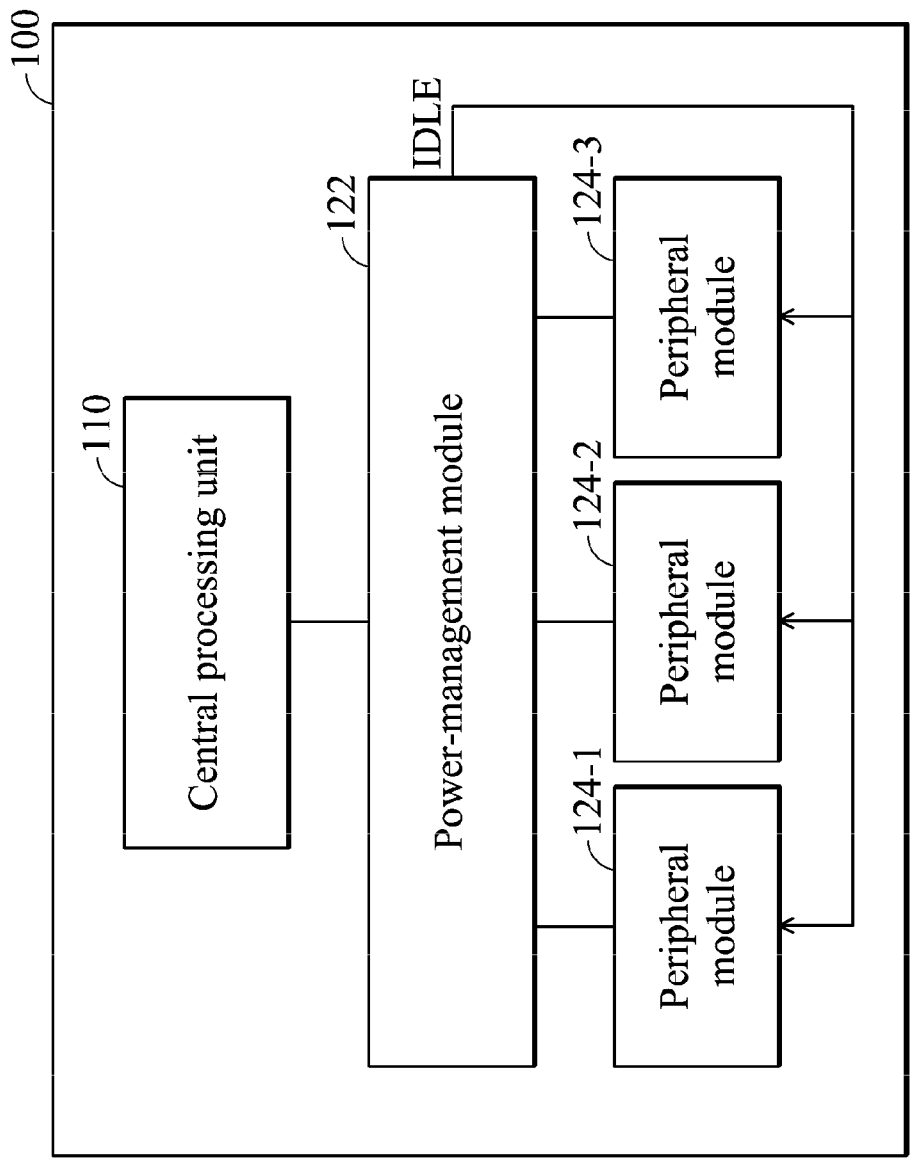
FIG. 1 is a block diagram illustrating an embodiment of an electronic system.

FIG. 1 is a block diagram illustrating an embodiment of an electronic system. The electronic system 100 comprises a central processing unit 110, and peripheral modules 124-1, 124-2 and 124-3. For example, the electronic system 100 uses the Advanced Configuration and Power Interface (ACPI) to define the power states of the central processing unit 110, and the power states of the central processing unit 110 may comprise a working state (C0 state), a plurality of low-power states (such as the C1 state, C2 state, C3 state and C4 state). In an embodiment, the electronic system 100 further comprises a power-management module 122, such as a power-management unit (PMU), which is configured to control the power state of the central processing unit 110. The peripheral modules 124-1, 124-2 and 124-3 may be Bus Masters or input/output devices, such as PCIE controller, PCI controller, HD Audio controller, SDIO and memory interface controller, keyboard/mouse controller, and USB controller, etc. However, it is not limited thereto. In an embodiment, the electronic system 100 is a computer system of X86 platform, the power-management module 122 and the peripheral modules 124-1, 124-2 and 124-3 are built in a chipset. In some embodiments, the power-management module 122 can generate an idle reminder signal or a delay reminder signal to all of the peripheral modules 124-1, 124-2 and 124-3, in order to advise the peripheral modules 124-1, 124-2 and 124-3 of the timing of the data transmission. Therefore, the duration period of the central processing unit 110 remaining in a lower-power state can be extended. It should be noted that the three peripheral modules in the embodiment are only for example, but the invention is not limited thereto. The electronic system 100 can have only one peripheral module or multiple peripheral modules.

Figure 2:
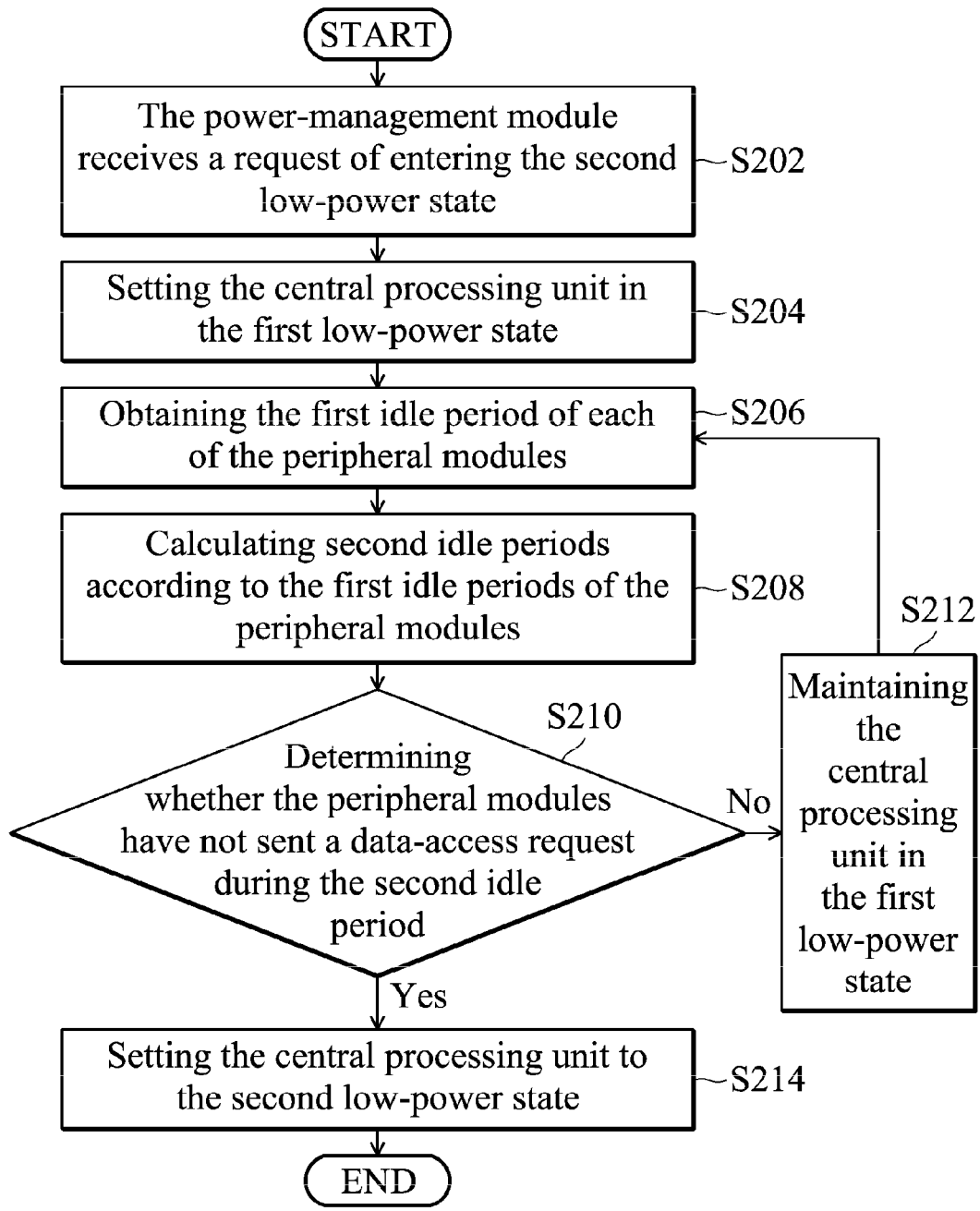
FIG. 2 is a flowchart of an embodiment of a power-management method for the electronic system.
Figure 4:
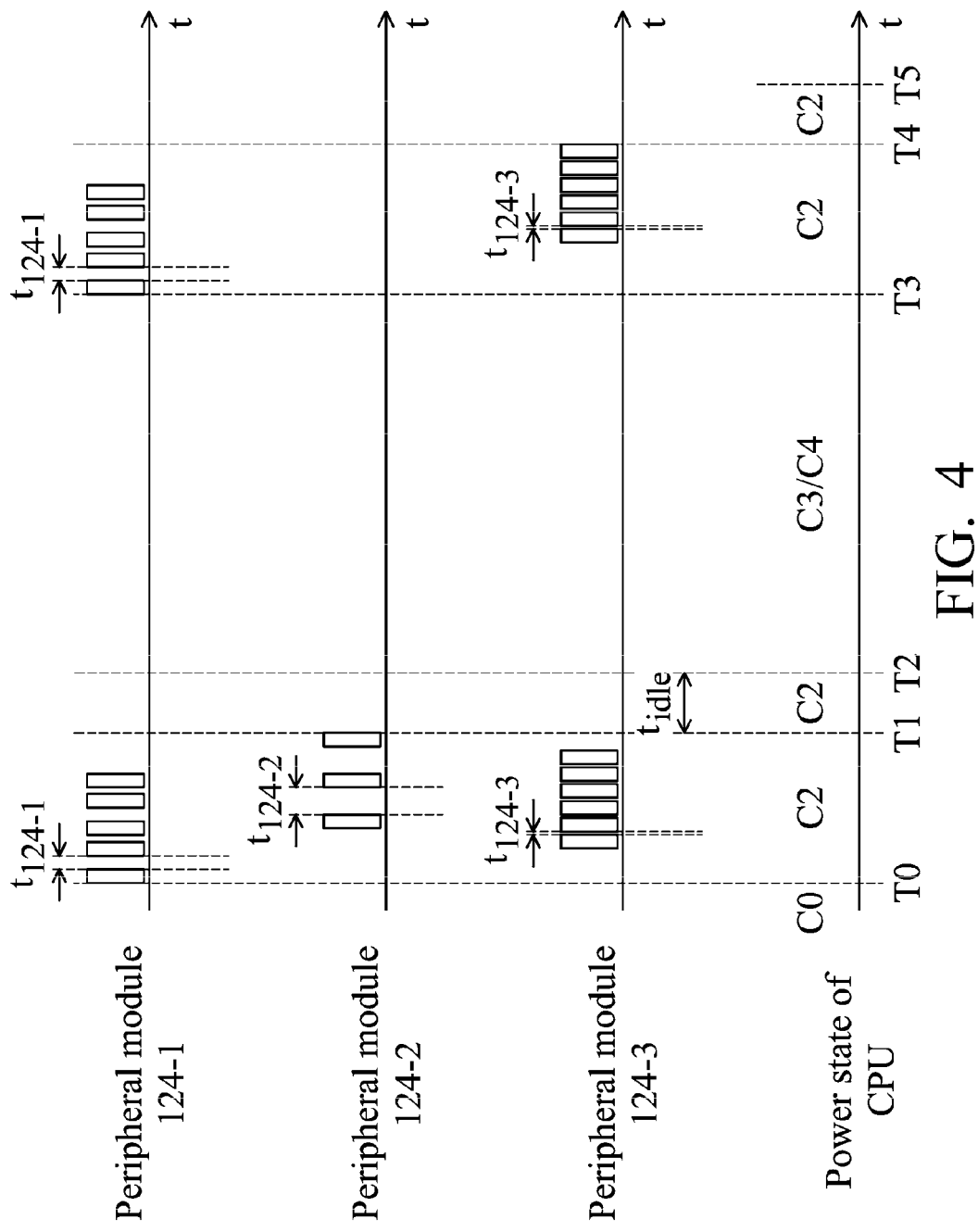
FIG. 4 is a diagram showing a sequence diagram of an embodiment of data transmission of the peripheral modules.

FIG. 2 is a flowchart of an embodiment of a power-management method for the electronic system. FIG. 4 is a diagram showing a sequence diagram of an embodiment of data transmission of the peripheral modules 124-1, 124-2 and 124-3. The invention is described below with the flowchart of FIG. 2 and data transmission sequence diagram of FIG. 4.

In step S202, the power-management module 122 receives a request requiring the central processing unit 110 to enter the second low-power state (such as the C3 or C4 state), wherein the request issued by operation system (not shown in figures). Next, in step S204, the power-management module 122 sets the central processing unit 110 in a first low-power state (such as the C2 state), as shown in FIG. 4, the request requiring the central processing unit 110 to enter the second low-power state is received at time T0, and the central processing unit 110 switches from the working state (C0 state) to the first low-power state (C2 state).

The following description will firstly describe how the operation system determines to enter the second low-power state (such as the C3 or C4 state), and issues the request requiring the central processing unit 110 to enter the second low-power state to the power-management module 122. When all of the processes of the operation system in the electronic system 100 are in the sleep state, the operation system takes an idle process as an active process. The idle process requests the central processing unit 110 to be set to a low-power state. The operation system predicts a current idle duration period according to the history idle status and the current idle status of the electronic system 100. The operation system compares the current idle duration period with the threshold period of each of the low-power states (such as the C1 state, C2 state, C3 state and C4 state), and selects a low-power state as a target state. The target state can match the exit latency of the low-power state, and also reduce the power consumption of the central processing unit 110 as much as possible. For example, if the current idle duration period exceeds a predetermined time, the C3 state is selected as the target state. The operation system uses interface function of drivers to notify the hardware system of the electronic system 100 (as shown in FIG. 1) to set the central processing unit 110 to the selected low-power state.

After the hardware system of the electronic system 100 (as shown in FIG. 1) receives the request requiring the central processing unit 110 to enter the C3/C4 state from the operation system, the hardware system of the electronic system 100 does not set the central processing unit 110 to the C3/C4 state immediately, but sets the central processing unit 110 to the C2 state. Next, the hardware system of the electronic system 100 activates an idle counter, and the power-management module 122 controls the corresponding signal to set the central processing unit 110 to the C3/C4 state when the Bus Master units of the peripheral modules 124-1, 124-2 and 124-3 have not sent a data-access request during the counting period ($T_{idle}$) of the idle counter. After the central processing unit 110 enters the C3/C4 state, the central processing unit 110 may wake up to the C2 state when any of the Bus Master units of the peripheral modules 124-1, 124-2 and 124-3 sends a data-access request.

In an embodiment of the invention, the counting period ($T_{idle}$) of the idle counter may be a fixed value, but the actual operation status of the system may vary. That means the fixed counting period is not suitable in every case. For example, if the counting period ($T_{idle}$) is too long, the duration of the central processing unit 110 staying in the C3/C4 state is reduced, or the central processing unit 110 even cannot enter the C3/C4 state. On the other hand, if the counting period ($T_{idle}$) is too short, the central processing unit 110 may frequently switch between the C2 state and the C3/C4 state. The system may experience unnecessary power consumption in the above two cases.

An embodiment of the invention is described below with the flowchart of FIG. 2 and data transmission sequence diagram of FIG. 4, and how the invention dynamically determines the counting period ($T_{idle}$) is described. In step S206, the power-management module 122 obtains first idle periods $t_{124-1}$, $t_{124-2}$ and $t_{124-3}$ of the peripheral modules 124-1, 124-2 and 124-3, and the first idle period $t_{124-1}$, $t_{124-2}$ and $t_{124-3}$ are interval periods between two data transmissions which correspond to peripheral modules 124-1, 124-2 and 124-3 respectively. The first idle periods $t_{124-1}$, $t_{124-2}$ and $t_{124-3}$ of the peripheral modules 124-1, 124-2 and 124-3 are illustrated in FIG. 4. In FIG. 4, the horizontal axis represents the time axis, and the rectangular bar on the time axis indicates data transmission tasks. It should be noted that the data transmission is composed of the transmission time period (the width of the rectangular bar on the time axis) and idle time period (the width between two adjacent rectangular bars on the time axis), each peripheral module, 124-1, 124-2, and 124-3, estimates the first idle time value (the width between two adjacent rectangular bars on the time axis, as shown in FIG. 4) according to its design and reports to the power-management module 122. The first idle period $t_{124\text{-}1}$ is illustrated by using peripheral module 124-1 as an example. Assume that peripheral module 124-1 includes a buffer and can temporarily store continuous 100 us data packets, and data transmission starts for writing the data in the buffer to dynamic random access memory (DRAM) when the buffer is filled to 60% (filling 60 us consecutive data packets). Assume that it takes 40 us to write the data from the buffer to DRAM. When the peripheral module 124-1 receives the data packets, the data is temporarily stored in an internal buffer until the buffer is filled to 60%, and then the data transmission starts (it takes 40 us). Then, the buffer is filled to 60%, and the data transmission is started again, and so on. Note that the transmission duration of the peripheral modules 124-1 is 40 us, and the idle duration (the first idle period t124-1) is 60 us.

In step S208, the power-management module 122 calculates a second idle period $T_{idle}$ according to the first idle periods $t_{124\text{-}1}$, $t_{124\text{-}2}$ and $t_{124\text{-}3}$ of the peripheral modules 124-1, 124-2 and 124-3. In some embodiments, the second idle period $T_{idle}$ is the longest of the first idle periods $t_{124\text{-}1}$, $t_{124\text{-}2}$ and $t_{124\text{-}3}$. For example, if the first idle period $t_{124\text{-}1}$ is longer than both $t_{124\text{-}2}$ and $t_{124\text{-}3}$, the second idle period $T_{idle}$ may be set to be equal to the longest first idle period $t_{124\text{-}1}$.

In step S210, the power-management module 122 determines whether the peripheral modules have not sent a data-access request during the second idle period $T_{idle}$. For example, the power-management module 122 may activate an idle counter to count the second idle period $T_{idle}$. If the peripheral modules 124-1, 124-2 and 124-3 have no data transmission until the idle counter has counted to the second idle period $T_{idle}$ (the peripheral modules 124-1, 124-2 and 124-3 do not issue any data-access request from time $T_1$ to time $T_2$ as shown in FIG. 4), then step S214 is performed. Otherwise, if any of the peripheral modules 124-1, 124-2 and 124-3 issue a data-access request while the idle counter counts to the second idle period $T_{idle}$, then step S212 is performed.

In step S212, one of the peripheral modules 124-1, 124-2 and 124-3 has issued a data-access request during the second idle period $T_{idle}$, the power-management module 122 maintains the central processing unit 110 in the first low-power state (C2 state), and the process returns to step S206 until the peripheral module finishes the transmission of the data-access request. In an embodiment, if one of the peripheral modules 124-1, 124-2 and 124-3 issues a data-access request during the idle counter counting to the second idle period $T_{idle}$ ("No" of step S210), the power-management module 122 may reset the idle counter. When the peripheral module finishes the transmission of the data-access request and the electronic system is idle again, the power-management module 122 reactivates the idle counter to count the second idle period $T_{idle}$ (step S210). In an embodiment of the invention, if the first idle periods $t_{124\text{-}1}$, $t_{124\text{-}2}$ and $t_{124\text{-}3}$ of the peripheral modules 124-1, 124-2 and 124-3 in the electronic system 100 are nearly fixed, the process may return to step S210 instead of step S206, namely to reactivate the idle counter to count the same second idle period $T_{idle}$. In another embodiment, the process returns to step S206 after step S212 is finished, the power-management module 122 calculates a second idle period $T_{idle}$ again according to the idle periods of the peripheral modules 124-1, 124-2 and 124-3.

In step S214, it means that all of the peripheral modules 124-1, 124-2 and 124-3 do not issue a data-access request while the idle counter counts to the second idle period $T_{idle}$, as the time T2 in FIG. 4. At this time, the power-management module 122 sets the central processing unit 110 to the second low-power state (C3/C4 state), in order to reduce the power consumption of the electronic system 100. Also, after the central processing unit 110 enters the second low-power state, if one of the peripheral modules 124-1, 124-2 and 124-3 issues a data-access request, such as the peripheral module 124-1 issuing a data-access request at time T3 of FIG. 4, the power-management module 122 may wake the central processing unit 110 from the second low-power state (C3/C4 state) to the first low-power state (C2 state), and the central processing unit 110 processes the corresponding data transmission.

It should be noted that, before the central processing unit 110 enters the second low-power state, the power-management module 122 may continuously return to step S206 to obtain new first idle periods $t_{124\text{-}1}$, $t_{124\text{-}2}$ and $t_{124\text{-}3}$ of the peripheral modules 124-1, 124-2 and 124-3, and calculate a new second idle period $T_{idle}$ in step S208. Therefore, the invention can dynamically adjust the counting period (namely, the second idle period $T_{idle}$) of the idle counter, and determines whether to enter a lower-power state. Instead of setting the counting period of the idle counter to a fixed value, the invention can generate an appropriate second idle period $T_{idle}$ according to the situation of the peripheral modules, the duration of the electronic system in a lower-power state (C3/C4 state) can be extended, and it avoids the central processing unit 110 frequently switching between the first low-power state and the second low-power state.

Figure 3:
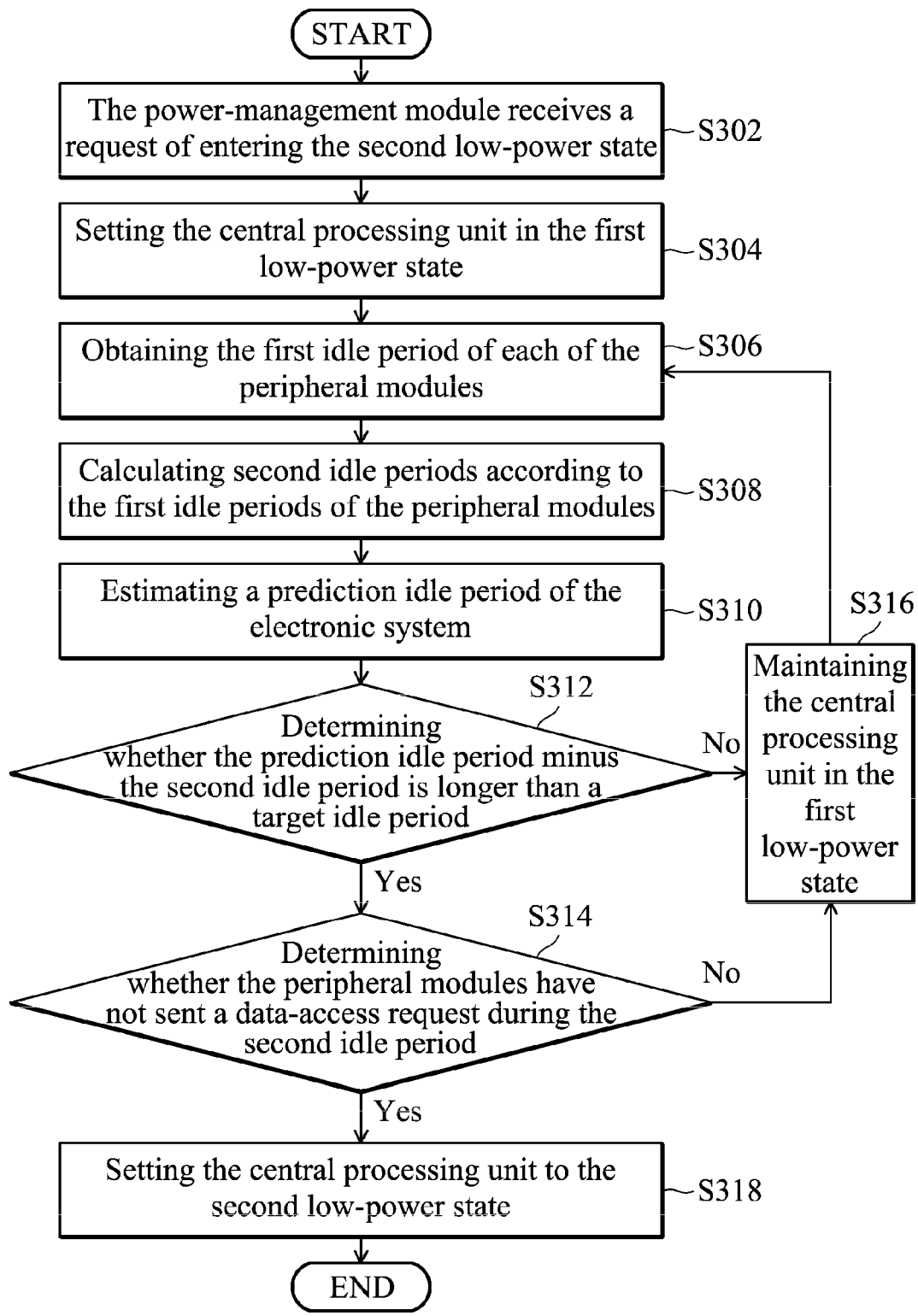
FIG. 3 is a flowchart of another embodiment of a power-management method for the electronic system.

FIG. 3 is a flowchart of another embodiment of a power-management method for the electronic system. In step S302, the power-management module 122 receives a request requiring the central processing unit 110 to enter the second low-power state (such as the C3/C4 state), wherein the request issued by the operation system (not shown in figures). Next, in step S204, the power-management module 122 sets the central processing unit 110 in a first low-power state (such as the C2 state).

In step S306, the power-management module 122 obtains first idle periods $t_{124\text{-}1}$, $t_{124\text{-}2}$ and $t_{124\text{-}3}$ of the peripheral modules 124-1, 124-2 and 124-3, and the first idle periods $t_{124\text{-}1}$, $t_{124\text{-}2}$ and $t_{124\text{-}3}$ are interval periods between two data transmissions which correspond to peripheral modules 124-1, 124-2 and 124-3 respectively. The first idle periods $t_{124\text{-}1}$, $t_{124\text{-}2}$ and $t_{124\text{-}3}$ of the peripheral modules 124-1, 124-2 and 124-3 are illustrated in FIG. 4.

In step S308, the power-management module 122 calculates a second idle period $T_{idle}$ according to the first idle periods $t_{124\text{-}1}$, $t_{124\text{-}2}$ and $t_{124\text{-}3}$ of the peripheral modules 124-1, 124-2 and 124-3. In some embodiments, the second idle period $T_{idle}$ is the longest of the first idle periods $t_{124\text{-}1}$, $t_{124\text{-}2}$ and $t_{124\text{-}3}$. For example, if the first idle period $t_{124\text{-}1}$ is longer than both $t_{124\text{-}2}$ and $t_{124\text{-}3}$, the second idle period $T_{idle}$ may be set to be equal to the longest first idle period multiplied by an appropriate weighted value.

Next, in step S310, the power-management module 122 further estimates a prediction idle period of the electronic system 100. For example, the idle period of the electronic system 100 is an interval period during which all the peripheral modules have not issued any data request, such as the interval period between time T1 and time T3 in FIG. 4. The prediction idle period of the electronic system 100 can be estimated according to multiple history idle periods of the electronic system 100, wherein the history idle periods may be the latest ten idle periods of the electronic system 100. The history idle periods may be gathered and stored by the power-management module 122. When the power-management module 122 obtains multiple history idle periods, the power-management module 122 estimates the prediction idle period of the electronic system 100 by a weighted averaging of the history idle periods.

Next, in step S312, the power-management module 122 determines whether the prediction idle period minus the second idle period $T_{idle}$ is longer than a target idle period. When the prediction idle period minus the second idle period $T_{idle}$ is longer than the target idle period, the process proceeds to step S314. On the other hand, when the prediction idle period minus the second idle period $T_{idle}$ is not longer than the target idle period, the process proceeds to step S316. During the target idle period, the sum of the power consumption of the central processing unit 110 switching from the first low-power state to the second low-power state, the power consumption of the central processing unit 110 remaining in the second low-power state, and the power consumption of the central processing unit 110 switching from the second low-power state to the first low-power state are equal to the power consumption of the central processing unit 110 remaining in the first low-power state during the target idle period. The power consumption of the central processing unit 110 in the second low-power state (C3/C4 state) is lower than the first low-power state (C2 state), but peak power occurs when the central processing unit 110 enters or exits the second low-power state (C3/C4 state). Therefore, only when the prediction idle period of the electronic system 100 is long enough (the prediction idle period minus the second idle period $T_{idle}$ is longer than the target idle period as step S312), the power consumption of the central processing unit 110 entering the second low-power state until it is woken up from the second low-power state is less than the power consumption of the central processing unit 110 remaining in the first low-power state. At this time, the central processing unit 110 enters the second low-power state so that it can reduce power consumption, thus avoiding wasting power and causing the system to have low efficiency. In some embodiments, the target idle period may be an appropriate value according to experiences or experiments, so that it can determine whether the central processing unit 110 entering the second low-power state has more benefit. The central processing unit 110 frequently switching between the first low-power state and the second low-power state can be avoided.

In step S314, the power-management module 122 determines whether the peripheral modules have not sent a data-access request during the second idle period $T_{idle}$. If the peripheral modules have not sent a data-access request during the second idle period $T_{idle}$, the process proceeds to step S318, otherwise, the process proceeds to step S316. The details of the technique in step S314 are similar to those in step S210 of FIG. 2, so they are not described further.

In step S316, the power-management module 122 maintains the central processing unit 110 in the first low-power state (C2 state), and the process returns to step S306 until the peripheral module finishes the transmission of the data-access request. The details of the technique in step S316 are similar to those of step S212 of FIG. 2, so they are not described further.

In step S318, the power-management module 122 sets the central processing unit 110 to the second low-power state (C3/C4 state), in order to reduce the power consumption of the electronic system 100. Also, after the central processing unit 110 enters the second low-power state, if one of the peripheral modules 124-1, 124-2 and 124-3 issues a data-access request, the power-management module 122 may wake the central processing unit 110 from the second low-power state to the first low-power state, and the central processing unit 110 processes with the corresponding data transmission. The details of the technique in step S318 are similar to those of step S214 of FIG. 2, so they are not described further.

In some embodiments of the invention, when the power-management module 122 receives the request requiring the central processing unit to enter the second low-power state, wherein the request issued by the operation system, the power-management module 122 further outputs idle reminder signals to each of the peripheral modules 124-1, 124-2 and 124-3, and the peripheral modules 124-1, 124-2 and 124-3 speed up the data transmission when they receive the idle reminder signals. In other words, the inner buffer of the peripheral module is cleared as much as possible before the central processing unit 110 is set to the second low-power state (C3/C4 state), and the time of the next data transmission of the peripheral module can be delayed, such that the duration of the central processing unit 110 remaining in the second power state (C3/C4 state) can be extended.

Also, when the central processing unit 110 is set to the second low-power state (such as step S214 or step S318), the power-management module 122 further outputs a delay reminder signal to each of the peripheral modules 124-1, 124-2 and 124-3. The peripheral modules 124-1, 124-2 and 124-3 delay data transmissions when they receive the delay reminder signal. Therefore, the time of the next data transmission of the peripheral module can be delayed, such that the duration of the central processing unit 110 remaining in the second power state (C3/C4 state) can be extended.

An embodiment of the idle/delay reminder signal is described with FIG. 1 below. The power-management module 122 outputs an idle signal IDLE to all of the peripheral modules 124-1, 124-2 and 124-3 for advising the timing of data transmission. As shown in the following Table 1, the idle/delay reminder signal is signal IDLE having 2 bits, for example. However, the idle/delay reminder signal should not be limited to the form of Table 1 as follows:

TABLE 1

| Code | power state of CPU | description |
|---|---|---|
| 2'b00 | C0 | The peripheral modules regularly process data transmission. |
| 2'b01 | C2 | Idle reminder signal, for reminding the peripheral module to speed up data transmission |
| 2'b10 | C3/C4 | Delay reminder signal, for reminding the peripheral module to temporarily stop issuing of data transmission |
| 2'b11 | reserved | reserved |

The idle signal IDLE is described in detail below.

When the idle signal IDLE is "2'b00", the electronic system 100 is active, and the peripheral modules regularly process data transmission.

When the idle signal IDLE is "2'b01", which is the idle reminder signal, the electronic system 100 is in the C2 state, and the peripheral modules should process data transmissions as quickly as possible. For example, it assumes that peripheral module 124-1 includes a buffer that can temporarily store continuous 100 us data packets, and data transmission starts for writing the data in the buffer to dynamic random access memory (DRAM) when the buffer is filled to 60% (filling 60 us consecutive data packets). When the idle signal IDLE with code "2'b01" is received, the peripheral module 124-1 should quickly write the data in the buffer to DRAM, and it does not need to wait until the buffer is filled to 60%, such that the buffer can have a larger space when the system enters the C3/C4 state. Also, if the peripheral module 124-2 is a High Definition Audio Controller, the peripheral module 124-2 should read more data from DRAM to the buffer when it receives the idle reminder signal (IDLE=2'b01), such that the buffer can contain more data when the system enters the C3/C4 state, and the duration of the central processing unit 110 being in the second power state (C3/C4 state) can be extended.

When the idle signal IDLE is "2'b10", which is the delay reminder signal, it means the electronic system 100 is in C3/C4 state. The peripheral modules 124-1 should not issue the data transmission as long as possible, in order to maintain the central processing unit 110 in the C3/C4 state. For example, it assumes that the peripheral modules 124-1 will issue a data transmission request when the buffer is filled to 60% in the regular situation. However, when the peripheral module 124-1 receives the delay reminder signal (IDLE=2'b10), the peripheral module 124-1 issues a data transmission request only when the buffer is filled to 80%, such that the duration period of the central processing unit 110 staying in the second power state (C3/C4 state) can be extended.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power-management method for an electronic system, wherein the electronic system comprises a central processing unit and a plurality of peripheral modules, and a power state of the central processing unit includes a working state, a first low-power state and a second low-power state, wherein the power-management method comprises:
    setting the central processing unit in the first low-power state when receiving a request requiring the central processing unit to enter the second low-power state;
    obtaining first idle periods of the peripheral modules respectively;
    determining a second idle period according to the first idle periods of the peripheral modules;
    determining whether the peripheral modules have not sent a data-access request during the second idle period; and
    setting the central processing unit in the second low-power state when the peripheral modules have not sent the data-access request during the second idle period,
    wherein each first idle period is an interval period between two data transmissions of each peripheral module.

2. The method of claim 1, further comprising
    maintaining the central processing unit in the first low-power state when one of the peripheral modules sends the data-access request during the second idle period; and
    after the peripheral module finishes the transmission of the data-access request, determining whether the peripheral modules have not sent a data-access request during the second idle period.

3. The method of claim 2, wherein after the peripheral module finishes the transmission of the data-access request, the counting of the second idle period is reset.

4. The method of claim 1, further comprising:
    estimating a prediction idle period of the electronic system;
    determining whether the prediction idle period minus the second idle period is longer than a target idle period; and
    when the prediction idle period minus the second idle period is not longer than the target idle period, maintaining the central processing unit being in the first low-power state.

5. The method of claim 4, further comprising:
    obtaining a plurality of history idle periods of the electronic system; and
    calculating the prediction idle period by a weighted averaging of the history idle periods.

6. The method of claim 1, wherein the request requiring the central processing unit to enter the second low-power state is issued by an operation system.

7. The method of claim 1, wherein the second idle period is set to the longest of the first idle periods of the peripheral modules.

8. The method of claim 1, wherein when the request requiring the central processing unit to enter the second low-power state is received, an idle reminder signal is further output to the peripheral modules; and the peripheral modules speed up data transmission when receiving the idle reminder signal.

9. The method of claim 1, wherein when the central processing unit is set to the second low-power state, a delay reminder signal is output to the peripheral modules; and the peripheral modules delay data transmission when receiving the delay reminder signal.

10. The method of claim 1, wherein the first low-power state is C2 state defined by the Advanced Configuration and Power Interface (ACPI), and the second low-power state is C3 state or C4 state defined by the Advanced Configuration and Power Interface (ACPI).

11. An electronic system, comprising:
    a central processing unit, wherein a power state of the central processing unit includes a working state, a first low-power state and a second low-power state;
    a plurality of peripheral modules; an
    a power-management module, setting the central processing unit in the first low-power state when receiving a request requiring the central processing unit to enter the second low-power state,
    wherein the power-management module is configured to obtain first idle periods of the peripheral modules respectively, determine a second idle period according to the first idle periods of the peripheral modules, and determine whether the peripheral modules have not sent a data-access request during the second idle period;
    wherein when the peripheral modules have not sent the data-access request during the second idle period, the power-management module sets the central processing unit in the second low-power state; and
    wherein each first idle period is an interval period between two data transmissions of each peripheral module.

12. The electronic system of claim 11, wherein the power-management module maintains the central processing unit in the first low-power state when one of the peripheral modules sends the data-access request during the second idle period; and
    after the peripheral module finishes the transmission of the data-access request, the power-management module determines whether the peripheral modules have not sent a data-access request during the second idle period.

13. The electronic system of claim 12, wherein the power-management module further comprises an idle counter, the idle counter is configured to count the second idle period, and the power-management module resets the idle counter after the peripheral module finishes the transmission of the data-access request.

14. The electronic system of claim 11, wherein the power-management module further estimates a prediction idle period of the electronic system, and determines whether the prediction idle period minus the second idle period is longer than a target idle period; and
  wherein when the prediction idle period minus the second idle period is not longer than the target idle period, the power-management module maintains the central processing unit in the first low-power state.

15. The electronic system of claim 14, wherein the power-management module obtains a plurality of history idle periods of the electronic system, and calculates the prediction idle period by a weighted averaging of the history idle periods.

16. The electronic system of claim 11, wherein the request requiring the central processing unit to enter the second low-power state is issued by an operation system.

17. The electronic system of claim 11, wherein the second idle period is set to the longest of the first idle periods of the peripheral modules.

18. The electronic system of claim 11, wherein when the power-management module receives the request requiring the central processing unit to enter the second low-power state, the power-management module further outputs an idle reminder signal to the peripheral modules, and the peripheral modules speed up data transmission when receiving the idle reminder signal.

19. The electronic system of claim 11, wherein when the central processing unit is set to the second low-power state, the power-management module outputs a delay reminder signal to the peripheral modules, and the peripheral modules delay data transmission when receiving the delay reminder signal.

20. The electronic system of claim 11, wherein the first low-power state is C2 state defined by the Advanced Configuration and Power Interface (ACPI), and the second low-power state is C3 state or C4 state defined by the Advanced Configuration and Power Interface (ACPI).

* * * * *